US 7,380,963 B2

(12) United States Patent
Maes et al.

(10) Patent No.: US 7,380,963 B2
(45) Date of Patent: Jun. 3, 2008

(54) METHOD OF ACCURATELY CONTROLLING A COOLING PROCESS OF A HIGH POWER LAMP

(75) Inventors: Wouter Jozef Maes, Turnhout (BE); Jan Alfons Julia Stoffels, Turnhout (BE); Edmond Mariette Emile Verstraeten, Turnhout (BE)

(73) Assignee: Koninklijke Philips Electronics, N.V., Eindhoven (NL)

( * ) Notice: Subject to any disclaimer, the term of this patent is extended or adjusted under 35 U.S.C. 154(b) by 63 days.

(21) Appl. No.: 10/556,283

(22) PCT Filed: May 10, 2004

(86) PCT No.: PCT/IB2004/050621

§ 371 (c)(1),
(2), (4) Date: Nov. 9, 2005

(87) PCT Pub. No.: WO2004/102068

PCT Pub. Date: Nov. 25, 2004

(65) Prior Publication Data

US 2006/0285335 A1    Dec. 21, 2006

(30) Foreign Application Priority Data

May 14, 2003   (EP)   .................................. 03101353

(51) Int. Cl.
 *F21V 29/00*   (2006.01)
(52) U.S. Cl. ...................... 362/294; 362/373
(58) Field of Classification Search ................ 362/294, 362/373
See application file for complete search history.

(56) References Cited

U.S. PATENT DOCUMENTS

| 4,405,882 | A | | 9/1983 | Reinsch |
| 5,097,400 | A | * | 3/1992 | Cvek ........................... 362/294 |
| 5,814,735 | A | * | 9/1998 | Kurisaki et al. ......... 73/861.22 |
| 6,340,237 | B1 | * | 1/2002 | Koga et al. .................. 362/294 |
| 6,447,146 | B1 | * | 9/2002 | Skinner et al. ............. 362/294 |
| 2002/0064056 | A1 | | 5/2002 | Li |

FOREIGN PATENT DOCUMENTS

| DE | 10100724 A1 | 7/2002 |
| EP | 1384943 A2 | 1/2004 |
| GB | 2380856 A | 4/2003 |
| WO | 2004008482 A2 | 1/2002 |

OTHER PUBLICATIONS

ISR: PCT/IB04/050621.
Written Opinion: PCT/IB04/050621.

* cited by examiner

*Primary Examiner*—Ali Alavi
*Assistant Examiner*—William J Carter

(57) ABSTRACT

A cooling unit (2) having a pump (20) for generating an airflow is provided for cooling a High Power lamp (10) during operation. The value of the airflow is controlled by a control unit (3) which comprises a driver (30) for determining a required value of the airflow on the basis of the operating power of the lamp (10). The control unit (3) comprises two pressure sensors (32, 33) for measuring a pressure of the airflow as well as a pressure drop of the airflow across an orifice (31). The driver (30) is designed for processing the measuring results in order to determine an actual value of the airflow. The value of the airflow is accurately controlled by adjustment of the power supply to the pump (20) in order to obtain a match of the actual value of the airflow and the required value of the airflow.

18 Claims, 3 Drawing Sheets

METHOD OF ACCURATELY CONTROLLING A COOLING PROCESS OF A HIGH POWER LAMP

Figure 1:
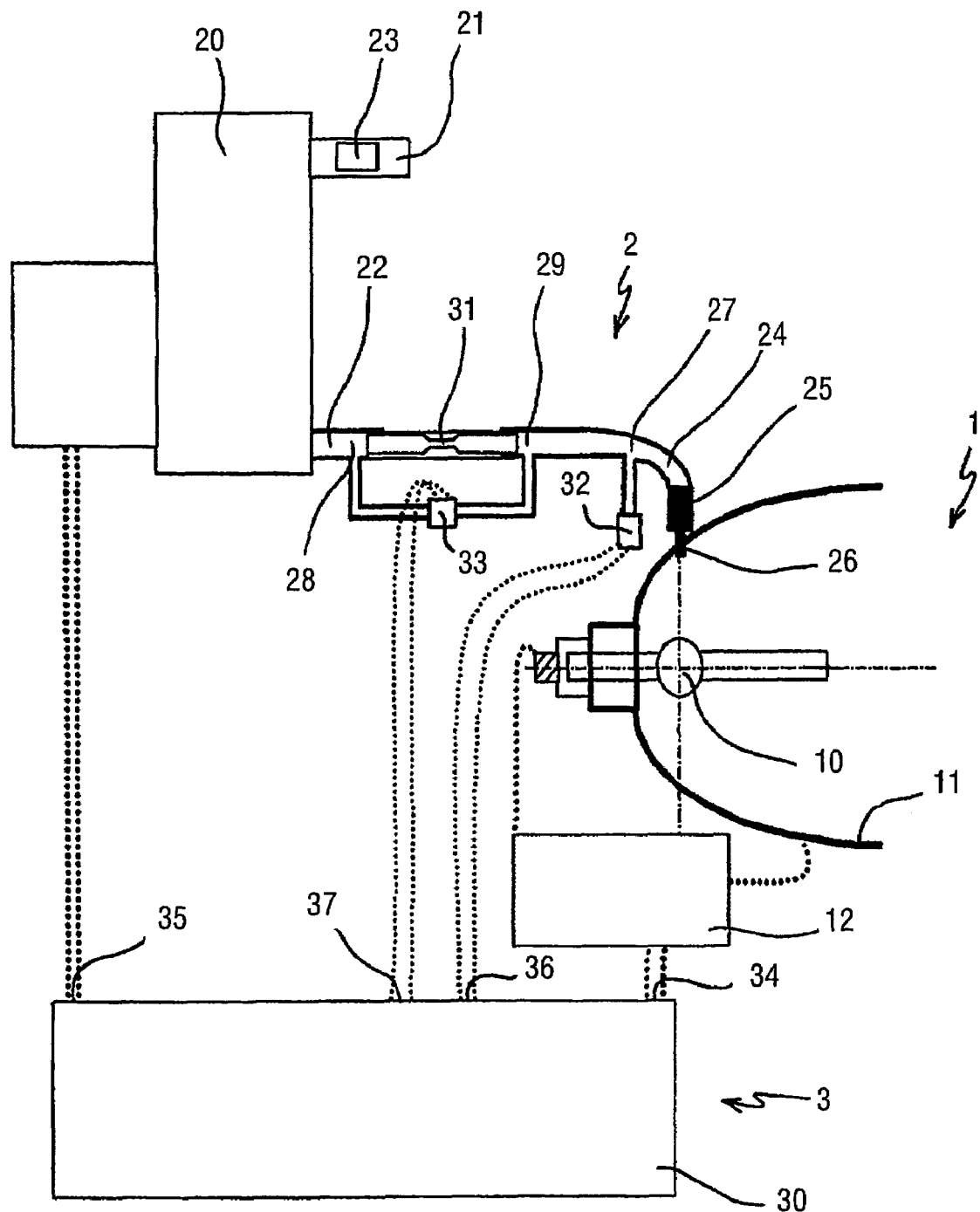

The present invention relates to a method of controlling a cooling process of a lamp, in particular a High Power lamp, wherein the cooling process takes place by means of a cooling medium flowing by the lamp.

A High Power lamp, which will hereinafter also be referred to as HP-lamp, is a lamp that is designed to operate at a relatively high power, for example a power higher than 300 W. During operation, cooling of the HP-lamp is necessary in order to prevent the lamp from getting too hot as a result of the high power. Normally, cooling of the HP-lamp takes place by means of a flow of pressured air that is generated by means of a fan. In the process, air is blown in the direction of the HP-lamp and is allowed to flow by the lamp.

The fan may simply be controlled so as to generate an airflow as long as the lamp is switched on. However, it is also possible to control the fan in a more sophisticated way, namely on the basis of results of measurements of the temperature in the vicinity of the lamp, which constitutes a workable indication of the temperature of the lamp itself. In such a case, when a measurement reveals that the temperature of the lamp has exceeded a defined maximum, the fan is switched on in order to generate an airflow for bringing the temperature of the lamp down to a tolerable level. As soon as the temperature of the lamp is below a defined minimum, the fan is switched off again. It will be understood that, if the fan is controlled in dependence of the temperature of the lamp, the fan is repeatedly switched on and off over an operation period of the lamp.

Recent developments in the field of HP-lamps have brought forth so-called Compact Power lamps, which will hereinafter also be referred to as CP-lamps. The cooling process of a CP-lamp should be accurately controlled in view of strict requirements with respect to the temperature of the CP-lamp during operation. The requirements comprise keeping the temperature of the CP-lamp between a defined minimum and a defined maximum.

It is an objective of the present invention to provide a method of controlling a cooling process of a lamp, which can be used for CP-lamps. This objective is achieved by a method in which the actual rate of flow of the cooling medium is controlled so as to equal a required value that is associated with the operating power of the lamp.

According to an important aspect of the present invention, the cooling process of the lamp is performed on the basis of controlling the actual rate of flow of the cooling medium. In the process, the actual rate of flow of the cooling medium is set to match a required value that is associated with the operating power of the lamp that needs to be cooled. If the lamp is dimmable, the operating power of the lamp is variable, as a consequence of which the required rate of flow of the cooling medium is variable. In such a case, a relation between the operating power of the lamp and the required rate of flow of the cooling medium may, for example, be laid down in a table, which table may be drawn up on the basis of results of simulations or experiments.

With respect to terms like "to equal" and "to match" pertaining to a comparison of different values, it will be understood that these should be interpreted in a practical sense rather than in an exact sense. For example, the actual rate of flow of the cooling air on the one hand and the required rate of flow of the cooling air on the other hand may be indicated as being equal as long as the difference between these values is within a predetermined small range comprising zero.

An important difference between the present invention and the state of the art is that according to the present invention the operating power of the lamp plays a role in controlling the cooling process of the lamp, as the required rate of flow of the cooling medium is associated with the operating power, whereas according to the state of the art the actual temperature of the lamp or the mere fact that the lamp is switched on or off plays a role in controlling the said process.

In a situation in which the method according to the present invention is applied, the cooling process can be controlled more accurately than in a known situation in which the method according to the state of the art is applied. Being relatively accurate, the method according to the present invention is suitable for controlling the cooling process of a CP-lamp.

Preferably, determining the actual rate of flow of the cooling medium is one of the steps in the process of controlling the actual rate of flow of the cooling medium. The actual rate of flow of the cooling medium may be determined, for example, with the help of a flow meter as known in the state of the art. However, according to an important aspect of the present invention, it is also possible only to use one or more pressure sensors, and to derive the actual rate of flow of the cooling medium from the results of the pressure measurements performed by the pressure sensors. This is an advantageous possibility, as pressure sensors are cheaper, smaller, and more reliable than flow meters. Furthermore, information regarding the pressure may not only be used to determine the rate of flow of the cooling medium, but also to indicate whether leakages or blockages are present in a duct through which the cooling medium is flowing.

Figure 2:
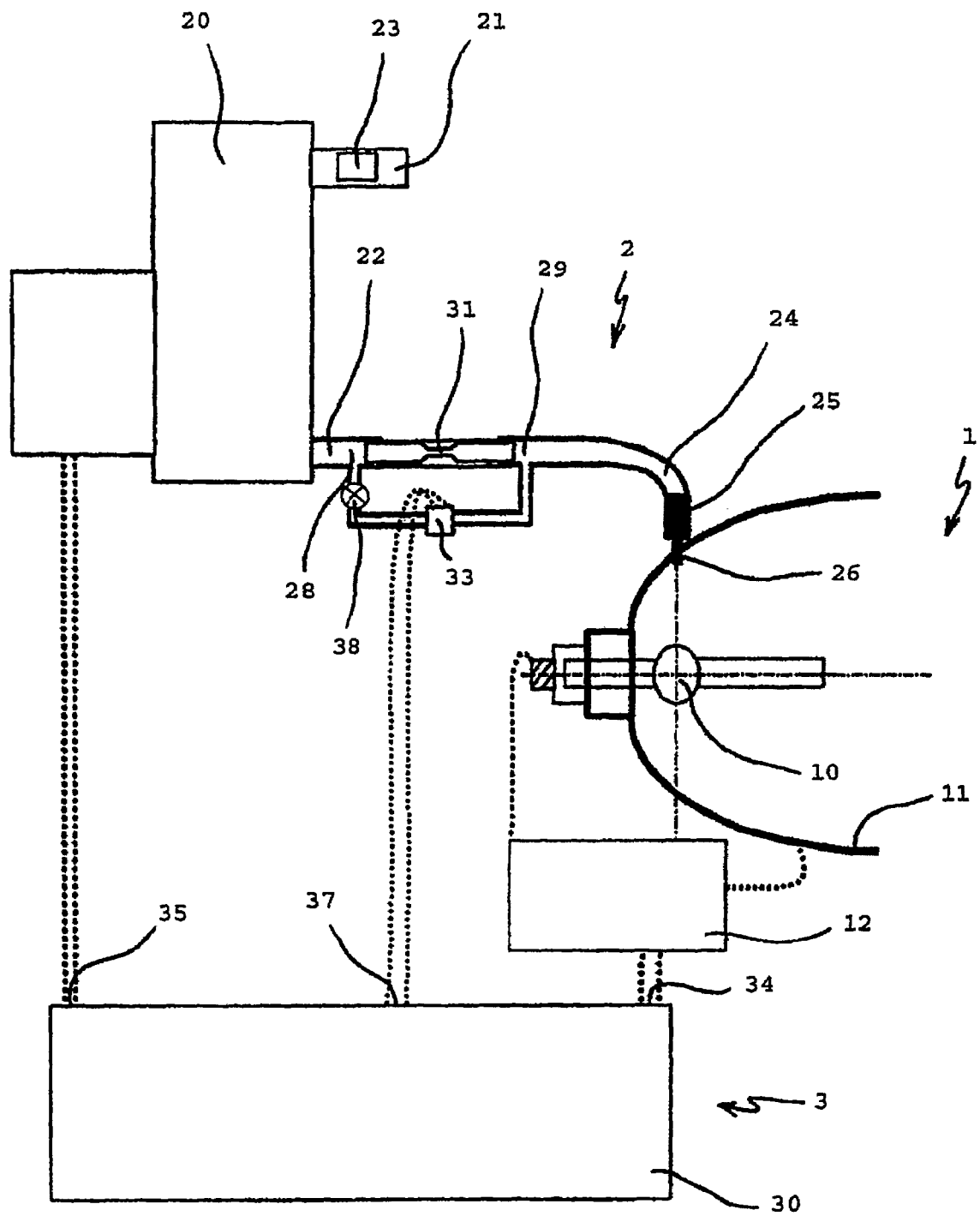
Figure 3:
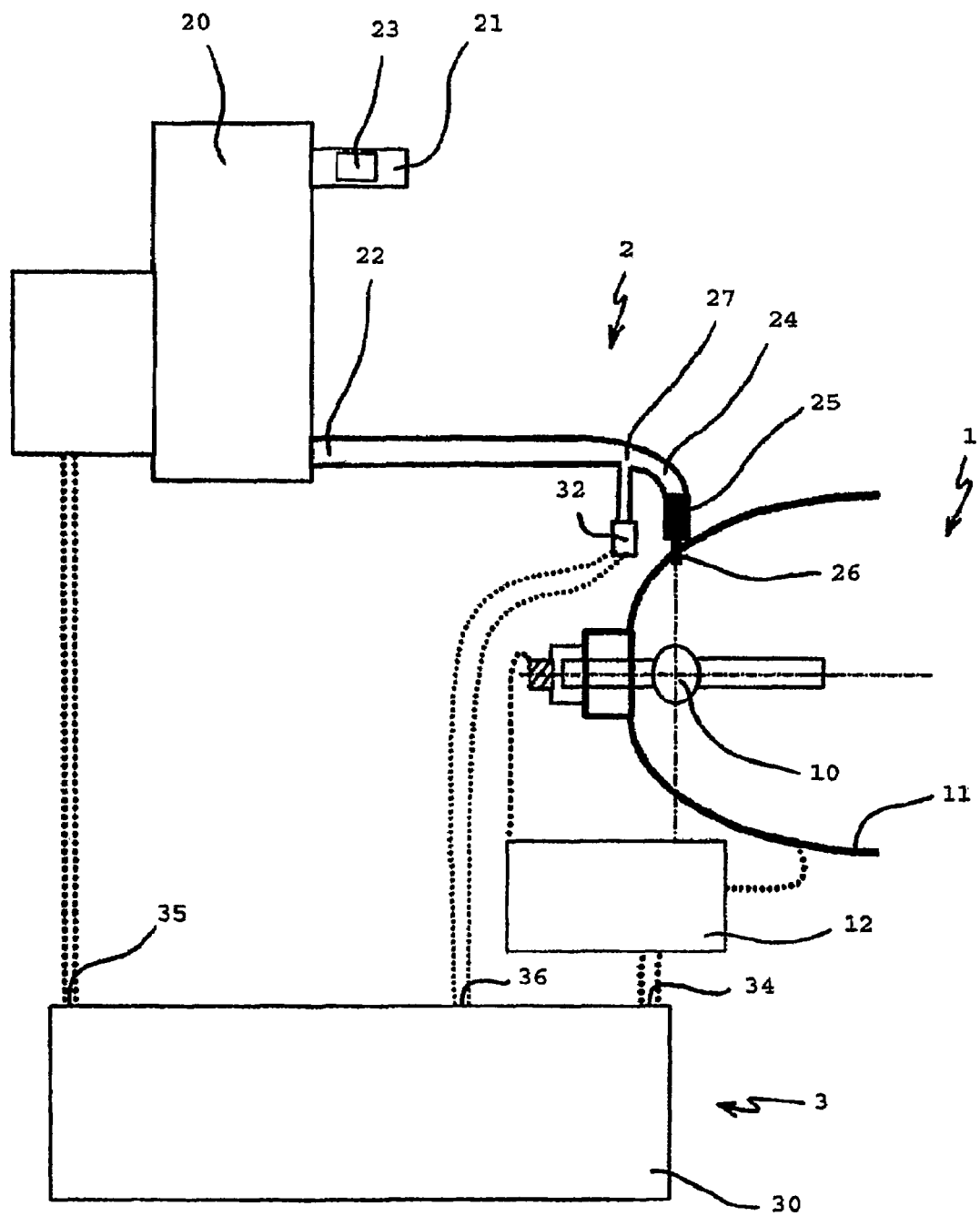

The present invention will now be explained in greater detail with reference to the Figures, in which similar parts are indicated by the same reference signs, and in which:

FIG. 1 diagrammatically shows a lamp unit having a lamp, a cooling unit for cooling the lamp, and a control unit according to a first preferred embodiment of the present invention for controlling the lamp and the cooling unit;

FIG. 2 diagrammatically shows the lamp unit and the cooling unit as shown in FIG. 1, and a control unit according to a second preferred embodiment of the present invention; and FIG. 3 diagrammatically shows the lamp unit and the cooling unit as shown in FIG. 1, and a control unit according to a third preferred embodiment of the present invention.

In FIG. 1, a lamp unit 1 having a CP-lamp 10 is shown. The lamp 10 is surrounded by a cup-shaped reflector 11 for directing light emitted by the lamp 10 during operation in a predetermined direction the lamp unit 1 comprises an ignitor 12 for the purpose of igniting the lamp 10.

FIG. 1 further shows a cooling unit 2 having a pump 20. The pump 20 comprises an inlet 21 for sucking in air and an outlet 22 for blowing out air. In the example shown, a filter 23 is positioned inside the inlet 21 for purifying the sucked-in air. The cooling unit 2 comprises a duct 24 for transporting cooling air, wherein one side of the duct 24 is connected to the outlet 22 of the pump 20, and wherein another side of the duct 24 is connected to a nozzle 25. The reflector 11 of the lamp unit 1 comprises a hole, and the nozzle 25 extends through the hole, such that a free end 26 of the nozzle 25 is located inside the reflector 11.

During operation of the pump 20, air is forced to flow through the duct 24 in the direction of the nozzle 25. The nozzle 25 is shaped and positioned such that the airflow exiting the free end 26 of the nozzle 25 is directed towards the lamp 10. As a result of this configuration, cooling air flows by the lamp 10 during operation of the pump 20, and the lamp 10 is cooled.

Cooling of the lamp 10 is necessary in view of the fact that the temperature of the lamp 10 is not allowed to exceed a predetermined maximum. Without cooling, the temperature of the lamp 10 would get too high, simply because of the fact that the lamp 10 generates much heat during its operation.

For the purpose of controlling the lamp 10 and the flow of cooling air, a control unit 3 is provided, comprising a driver 30, an orifice 31 located in the duct 24, and two pressure sensors 32, 33. The way in which the shown control unit 3 works during operation of the lamp 10 and the pump 20 is explained in the following paragraphs.

The power at which the lamp 10 is operating may have a predetermined value, but the lamp 10 may also be dimmable, such that different dimmed levels correspond to different values of operating power. In such a case, the driver 30 determines the power at which the lamp 10 should be operating on the basis of input originating from a user of the lamp unit 1. The lamp 10 is electrically connected to a first power output 34 of the driver 30. In this configuration, (the value of) the operating power of the lamp 10 is determined by (the value of) the power supply at the first power output 34.

If the operating power of the lamp 10 has a predetermined value, a predetermined rate of required flow of cooling air is laid down in the driver 30. If the lamp 10 is dimmable, the driver 30 is able to determine a required rate of flow of cooling air on the basis of the set value of the operating power of the lamp 10. It is true in general that the higher the value of the operating power, the higher the required value of the airflow.

The value of the airflow is directly related to the level at which the pump 20 is operating. Therefore, the driver 30 is able to convert the required rate of flow of cooling air into a required power supply to the pump 20. For the purpose of actually supplying power to the pump 20, the driver 30 comprises a second power output 35 and the pump 20 is electrically connected to this power output 35 of the driver 30.

It is important that the temperature of the lamp 10 should be accurately kept between predetermined limits. Consequently, it is important that the flow of cooling air should be accurately controlled. In this respect, it is favorable to check whether the actual rate of flow of cooling air corresponds to the required rate of flow of cooling air, as the rate of flow of cooling air is not only influenced by the performance of the pump 20, but also, for example, by the density of the air, which is dependent on conditions like pressure and temperature. With respect to the pressure, it is remarked that this condition is mainly dependent on the altitude of the environment in which the lamp unit 1, the cooling unit 2, and the control unit 3 are applied. In relatively high areas the value of an atmospheric pressure may be 700 mbar, whereas in lower areas the value of the atmospheric pressure is significantly higher, for example 1000 mbar. The control unit 3 shown is designed so as to compensate for variations in conditions of the environment in which the lamp unit 1 is located. Determining the actual rate of flow of cooling air constitutes a main factor in realizing the compensation.

A known flow meter capable of measuring the rate of flow of cooling air through the duct 24 may be used for determining the actual rate of flow of cooling air. However, a more accurate meter than the known flow meter would be preferred for measuring the rate of flow of cooling air for cooling a CP-lamp 10. Moreover, the known flow meter is rather large and expensive. For those reasons, the present invention proposes an alternative way of determining the actual rate of flow of cooling air through the duct 24.

According to the present invention, the actual rate of flow of cooling air is derived from data registered by two pressure sensors 32, 33, wherein one pressure sensor 32 is an absolute pressure sensor 32, and wherein another pressure sensor 33 is a relative pressure sensor 33.

The absolute pressure sensor 32 measures the value of the air pressure at an absolute pressure measuring location 27 in the duct 24. The absolute pressure measuring location 27 may be any suitable location in the duct 24, but is preferably as close as possible to the nozzle 25. If the pump 20 is not operating, the measured value of the air pressure corresponds to the value of the atmospheric pressure of the environment, which is mainly influenced by the altitude. If the pump 20 is generating an airflow, the measured value of the air pressure corresponds to the sum of the atmospheric pressure and the excess pressure in the duct 24.

The air pressure is directly related to the temperature and the air density. Assuming that the influence of the temperature may be ignored, the air density can be determined on the basis of the value of the air pressure registered by the absolute pressure sensor 32. However, within the scope of the present invention, it is possible to take the influence of the temperature into account as well. The control unit 3 may be provided, for example, with a thermometer or any other means for measuring the temperature, and the driver 30 may be arranged so as to process both the results of the temperature measurement and the results of the pressure measurement in order to determine the air density.

The relative pressure sensor 33 measures the value of a pressure drop across the orifice 31, which constitutes a defined constriction of the duct 24. For the purpose of measuring the value of the pressure drop, the relative pressure sensor 33 is connected to two pressure measuring locations 28, 29 in the duct 24, wherein a first relative pressure measuring location 28 is upstream of the orifice 31, and wherein a second relative pressure measuring location 29 is downstream of the orifice 31. The pressure of the flow of cooling air is influenced by the orifice 31 in such a way that the value of the pressure decreases while flowing from the first relative pressure measuring location 28 to the second relative pressure measuring location 29.

The results of the pressure measurements performed by the pressure sensors 32, 33 render it possible to determine the rate of flow of cooling air through the duct 24, which is equal to the rate of flow of cooling air through the orifice 31. The rate of flow of cooling air through the orifice 31 is a function of the square root of a division of the pressure difference across the orifice by the air density. As was explained above, the value of the air density can be determined on the basis of the air pressure registered by the absolute pressure sensor 32. The rate of flow of cooling air can be determined from this value of the air density and the value of the pressure drop across the orifice 31.

Advantageously, the absolute pressure sensor 32 is controlled such that it performs a measurement before the pump 20 is activated to generate an airflow. The value that is found as a result of this initial measurement corresponds to the value of the atmospheric pressure of the environment. This value is stored in the driver 30, which is then able to determine the value of the air density used in the process of determining the actual rate of flow on the basis of results of measurements performed by the relative pressure sensor 33. Furthermore, during the cooling process, the driver 30 is able to determine the value of the excess pressure by subtracting the stored value of the atmospheric pressure from the value of the air pressure measured by the absolute pressure sensor 32. In this way, at the start of the cooling process, the absolute pressure sensor 32 plays a role in compensating the influence of the altitude on the actual flow of the cooling air in the duct 24, whereas during the cooling process, the absolute pressure sensor 32 plays a role in monitoring the state of the cooling unit 2.

The above-described method of determining the rate of flow of cooling air using the absolute pressure sensor 32 and the relative pressure sensor 33 is advantageous in that the pressure sensors 32, 33 are relatively cheap and accurate. In cases in which the method is applied, the actual rate of flow of cooling air is more accurately determined than in cases in which the actual rate of flow is determined by means of a known flow meter. It will be understood that the application of the method is not restricted to the context of cooling lamps. Rather, the method is applicable in any situation in which an actual value of a flow needs to be determined.

An important advantage of the use of the absolute pressure sensor 32 is that it is possible to detect leakages in the duct 24 or the absence of a connection between the nozzle 25 and the duct 24. The latter situation may arise, for example, when the lamp unit 1 has been replaced by a user. A deviation of the value of the pressure measured by the absolute pressure sensor 32, i.e. a value lower than expected, is an indication of air escaping from the duct 24. It is also possible to detect blockages of the duct 24 or the nozzle 25, as in such a situation the value of the pressure measured by the absolute pressure sensor 32 will be higher than expected.

In the configuration as shown in FIG. 1, the results of the pressure measurements performed by the pressure sensors are transmitted to the driver 30. The driver 30 comprises a first signal input 36 for receiving a signal representing the value of the pressure as measured by the absolute pressure sensor 32. The driver 30 comprises a second signal input 37 for receiving a signal representing the value of the pressure difference measured by the relative pressure sensor 33.

The driver 30 is designed for processing the results of the measurements performed by the pressure sensors 32, 33 and for determining the actual rate of flow of cooling air through the duct 24. Advantageously, the driver 30 is also designed for checking whether the value of the air pressure measured by the absolute pressure sensor 32 is within a normal range of operating values. In such a case, the driver 30 may be designed so as to produce a warning signal and/or stop the operation of the lamp 10, possibly also of the cooling unit 2, when it is found that the measured value of the air pressure is outside the normal range of operating values.

In order to determine a required value of the operating power of the pump 20, the driver 30 is designed so as to compare the actual rate of flow of cooling air through the duct 24 with the rate of flow of cooling air through the duct 24 as required on the basis of the operating power of the lamp 10. If the compared values are the same or only deviate to an allowed extent, the value of the power supplied at the second power output 35 to the pump 20 is maintained. If too large a difference between the compared values is found, the value of the power supplied at the second power output 35 to the pump 20 is adjusted so as to eliminate the difference.

Preferably, as long as the lamp 10 is burning, the process of comparing the determined actual rate of flow of cooling air with the required value of cooling air is continually performed. Since the lamp 10 is a CP-lamp, it is important that the flow of the cooling air is accurately controlled. If the rate of flow of the cooling air would deviate too much from the value that is required on the basis of the operating power of the lamp 10 over a considerable period of time, the performance of the lamp 10 as well as the lamp 10 itself would be negatively affected. Such a situation might even lead to a total breakdown of the lamp 10.

It is important that the absolute pressure sensor 32 is able to register the complete range of possible values of the pressure, which range covers hundreds of millibars. Furthermore, it is important that the relative pressure sensor 33 is able to accurately measure the value of the pressure drop across the orifice 31. As the variation of the pressure drop is significantly smaller than the variation of the air pressure in the duct 24, it is sufficient for the relative pressure sensor 33 to be designed for registering a relatively narrow range of values. Consequently, the relative pressure sensor 33 may very well be able to meet the requirements regarding accuracy, which is advantageous in view of the fact that the flow of the cooling air is directly controlled on the basis of the results of the pressure measurements as performed by the relative pressure sensor 33.

The present invention offers the possibility of checking the state of the duct 24 and the nozzle 25 at the start of an operation period. In this way, safety may be enhanced, as it is an option not to ignite the lamp 10 until the pressure value measured by the absolute pressure sensor 32 is within acceptable limits.

The relation between the value of the operating power of the lamp 10 and the required flow of cooling air through the duct 24 is mainly dependent on characteristics of the lamp 10. If the lamp 10 is dimmable, there are several options regarding the form in which the said relation may be laid down in the driver 30. Within the scope of the present invention, it is not essential which form is applied. For example, the said relation may be laid down in the driver 30 as a table from which the driver 30 is able to derive values by means of extrapolation techniques.

An important aspect of the driver 30 is that this component of the control unit 3 is designed for controlling both the power supply to the lamp 10 and the pump 20. In this way, it is possible to relate the power supply to the pump 20 to the power supply to the lamp 10.

An advantageous aspect of the control unit 3 is that it is able to determine both the air pressure and the flow of cooling air. In this way, the advantages of determining the air pressure and determining the flow of cooling air are combined. Determining the air pressure reveals the presence of leakages or blockages in the duct 24 or the absence of a connection between the nozzle 25 and the duct 24, while determining the flow reveals the characteristics of the cooling process of the lamp 10. Within the scope of the present invention, it is possible only to use a flow meter for measuring the flow of cooling air, but in such a case there will be no information regarding the state of the duct 24 and the nozzle 25.

It will be understood that the lamp unit 1, the cooling unit 2, and the control unit 3 may be arranged in a fixture. Such a fixture may, for example, be a moving head fixture. Furthermore, the lamp unit 1, the cooling unit 2, and the control unit 3 may be part of any device in which a CP-lamp is advantageously applied, for example a projector.

It will be clear to those skilled in the art that the scope of the present invention is not limited to the examples discussed above, but that several amendments and modifications thereof are possible without deviating from the scope of the present invention as defined in the attached claims.

For example, a plurality of nozzles 25 may be provided instead of just one nozzle 25 as in the example shown. It will be understood that, if a plurality of nozzles 25 is provided, the reflector 11 of the lamp unit 1 comprises a plurality of holes. The use of a plurality of nozzles 25 offers the advantageous possibility of cooling different sides of the lamp 10 such that all sides may be simultaneously cooled, or one nozzle 25 at a time may be used to cool a side of the lamp 10 that constitutes the upper side of the lamp and is hotter than the other sides of the lamp. The latter option is relevant in a situation in which the lamp 10 is moved, as a result of which the side of the lamp 10 that constitutes the upper side of the lamp 10 is not always the same.

In the situation in which a plurality of nozzles 25 is used, the duct 24 may be designed such that it splits up behind the measuring locations 27, 28, 29, seen in the direction in which the cooling air flows. In such a configuration, it is sufficient to apply one set of an absolute pressure sensor 32 and a relative pressure sensor 33. For the purpose of monitoring the state of the different branches of the duct 24, controllable pneumatic switches or the like may be used for temporarily blocking all branches with the exception of one branch that is being checked.

Another possibility is that each nozzle 25 is connected to an individual duct 24, each duct 24 being associated with an individual set of an absolute pressure sensor 32 and a relative pressure sensor 33. In such a configuration, the flows of cooling air in the individual ducts 24 may be individually checked and controlled.

It will be understood that, if a plurality of nozzles 25 is applied, numerous possibilities exist for the design of the cooling unit 2 and the control unit 3, and that the mention of two of these possibilities in the foregoing paragraphs is not meant to have a limiting effect.

The shown lamp 10 is a CP-lamp, but that does not mean that the lamp may not be any suitable lamp that needs to be cooled during operation. In any case, the lamp 10 may be any kind of HP-lamp.

Summarizing, a cooling unit 2 having a pump 20 for generating a flow of cooling medium is provided for cooling a High Power lamp 10 of a lamp unit 1 during operation, wherein the lamp 10 may be dimmable. The rate of flow of the cooling medium is controlled by a control unit 3 which comprises a driver 30 for controlling both the power supply to the pump 20 of the cooling unit 2 and the power supply to the lamp 10 of the lamp unit 1. The driver 30 of the control unit 3 is designed so as to determine a required rate of flow of the cooling medium on the basis of the operating power of the lamp 10.

The control unit 3 comprises an absolute pressure sensor 32 for registering a pressure of the flow of the cooling medium and a relative pressure sensor 33 for registering a pressure drop of the flow of the cooling medium across an orifice 31. The driver 30 of the control unit 3 is designed for processing the registered flow pressure and the registered pressure drop in order to determine an actual rate of flow of the cooling medium. The rate of flow of the cooling medium is accurately controlled by adjustment of the power supply to the pump 20 in order to obtain a match of the actual rate of flow of the cooling medium and the required rate of flow of the cooling medium.

Within the scope of the present invention, the control unit 3 may be arranged in various ways. The control unit 3 does not necessarily need to comprise an absolute pressure sensor 32, a relative pressure sensor 33, and an orifice 31 as shown in FIG. 1. In the following paragraphs, a number of possible alternative embodiments of the control unit 3 are discussed.

In a relatively simple embodiment, the control unit 3 only comprises the driver 30, which is connected to the lamp unit 1 at the first power output 34 and which is connected to the pump 20 at the second power output 35. In this embodiment, the driver 30 may be designed for supplying both the lamp 10 and the pump 20 with power having respective predetermined values. According to an important aspect of the present invention, the value of the power of the pump 20 is chosen such that the temperature of the lamp 10 can be kept between a predetermined minimum and a predetermined maximum by means of the generated flow of cooling air. Therefore, the value of the power supply to the pump 20 is determined on the basis of the value of the operating power of the lamp 10, assuming an average value of environmental conditions, such as the atmospheric pressure. Due to the absence of sensors 32, 33, feedback on the obtained rate of flow of the cooling air can not be provided, and it is not possible to compensate for variations in the environmental conditions. Furthermore, it is not possible to check the condition of the cooling unit 2. If the lamp 10 is dimmable, the driver 30 contains at least two combinations of the values of the power of the lamp 10 and the pump 20, and the appropriate value of the power supply to the pump 20 is found on the basis of the set operating power of the lamp 10.

In another alternative embodiment modified with respect to the embodiment shown in FIG. 1, the control unit 3 comprises an excess pressure sensor instead of the absolute pressure sensor 32. This embodiment offers the possibility of checking the state of the cooling unit 2 on the basis of the value of the excess pressure measured by the excess pressure sensor. However, the control unit 3 is not able to compensate for the influence of variations in the value of the atmospheric pressure on the rate of flow of the cooling air, as information regarding the atmospheric pressure can not be obtained from the excess pressure sensor. In a situation in which this embodiment of the control unit 3 is applied, an actual rate of flow of cooling air is determined on the basis of the pressure drop measured by the relative pressure sensor 33 and a predetermined value of the air density that is laid down in the driver 30. Preferably, the predetermined value of the air density is based on an average value of the atmospheric pressure, which may be, for example, any value between 950 mbar and 1050 mbar.

In yet another alternative embodiment modified with respect to the embodiment shown in FIG. 1, the control unit 3 comprises an excess pressure sensor instead of the absolute pressure sensor 32, but does not comprise the orifice 31 and the relative pressure sensor 33. In this embodiment, the control unit 3 is only able to measure the value of the excess pressure of the flow of the cooling air. On the basis of this value, it is possible to obtain an indication of the state of the cooling unit 2. Furthermore, it is also possible to obtain an indication of the actual rate of flow, as this is related to the excess pressure for a nozzle 25 having defined characteristics. However, it is not possible to obtain information regarding the environmental conditions, and the actual rate of flow cannot be determined very accurately.

In yet another alternative embodiment, modified with respect to the embodiment shown in FIG. 1, the control unit 3 comprises the driver 30, the orifice 31, and the relative pressure sensor 33, but does not comprise the absolute pressure sensor 32. Due to the absence of the absolute pressure sensor 32, it is not possible to check the state of the cooling unit 2. Furthermore, it is not possible to compensate for variations in the environmental conditions. Instead, a predetermined value of the air density is laid down in the driver 30, which is used in calculating an actual rate of flow of cooling air generated by the pump 20. The predetermined value of the air density may be based on an average value of the atmospheric pressure, which may be, for example, any value between 950 mbar and 1050 mbar, as was noted above.

In yet another alternative embodiment, which is shown in FIG. 2, the control unit comprises the driver 30, the orifice 31, and the relative pressure sensor 33, and does not comprise the absolute pressure sensor 32, as in the embodiment described in the preceding paragraph. However, according to this embodiment, one side of the relative pressure sensor 33 is connected to the first pressure measuring location 28, and another side is connected to the second pressure measuring location 29 through a switching valve 38. This switching valve 38 renders it possible to choose whether to connect the relative pressure sensor 33 to the second pressure measuring location 29 or to the environment where the atmospheric pressure prevails. The switching valve 38 may be controlled so as to alternate its position continually, so that the relative pressure sensor 33 may be applied in an alternating manner. When connected to the second pressure measuring location 29, the relative pressure sensor 33 is able to determine the pressure drop across the orifice 31; when connected to the environment, it is able to determine the excess pressure. In this way, this embodiment of the control unit 3 comprising only a relative pressure sensor 33 can function as the embodiment of the control unit 3 comprising an excess pressure sensor in addition to a relative pressure sensor 33 as described further above.

In yet another alternative embodiment, which is shown in FIG. 3, the control unit 3 comprises the driver 30 and the absolute pressure sensor 32, but does not comprise the orifice 31 and the relative pressure sensor 33. The absolute pressure sensor 32 is controlled so as to perform a measurement at the start of an operation period, before the pump 20 is activated to generate an airflow. In this way, the value of the atmospheric pressure of the environment is found, which is stored in the driver 30. During the cooling process, the driver 30 is able to determine the value of the excess pressure by subtracting the stored value of the atmospheric pressure from the value of the air pressure measured by the absolute pressure sensor 32. Furthermore, the driver 30 is able to calculate an actual rate of flow of cooling air in the duct, taking into account the fact that the actual rate of flow is related to the value of the excess pressure for a nozzle 25 having defined characteristics, as was discussed above. In the process, since the absolute pressure sensor 32 is able to determine the value of the atmospheric pressure at the start of every cooling process, and the driver 30 is able to determine the value of the air density on the basis of the measured value of the atmospheric pressure, it is possible to compensate for the influence of the altitude on the actual rate of flow. Furthermore, it is possible to derive information regarding the state of the cooling unit 2 from the pressure value measured by the absolute pressure sensor 32.

The invention claimed is:

1. Method of controlling a cooling process of a lamp (10), in particular a High Power lamp, wherein the cooling process takes place by means of a cooling medium flowing by the lamp (10), and wherein an actual rate of flow of the cooling medium is controlled so as to equal a required value that is associated with the operating power of the lamp (10), further comprising:

measuring a value of pressure of the cooling medium, wherein the pressure includes a total of an environmental atmospheric pressure and an excess pressure of the flow of the cooling medium with respect to the environmental atmospheric pressure;

measuring a value of pressure drop of the cooling medium across an orifice positioned in the flow of the cooling medium;

determining a value of density of the cooling medium on the basis of the measured value of the pressure of the cooling medium; and determining a rate of flow of the cooling medium on the basis of the determined value of the density of the cooling medium and the measured value of the pressure drop of the flow of the cooling medium across the orifice.

2. Method according to claim 1, comprising the following steps:

a) determining the actual rate of flow of the cooling medium, wherein the actual rate of flow comprises the rate of flow determined on the basis of the determined value of density of the cooling medium and the measured value of the pressure drop of the flow of the cooling medium across the orifice;

b) comparing the actual rate of flow of the cooling medium determined during step a) with the required rate of flow of the cooling medium; and, if a difference between the actual value and the required rate of flow of the cooling medium is found, c) adjusting the actual rate of flow of the cooling medium such that it equals the required rate of flow of the cooling medium.

3. Method according to claim 2, wherein the rate of flow of the cooling medium is directly measured in the process of determining the actual rate of flow of the cooling medium during step a).

4. Method according to claim 2, wherein at least one pressure characteristic of the flow of the cooling medium is measured for the purpose of determining the actual rate of flow of the cooling medium during step a).

5. Method according to claim 4, wherein the pressure of the cooling medium is a total of an environmental atmospheric pressure and an excess pressure of the flow of the cooling medium over and above said environmental atmospheric pressure.

6. Method according to claim 4, wherein the pressure drop of the cooling medium across the orifice positioned in the flow of the cooling medium and the excess pressure of the flow of the cooling medium with respect to the environmental atmospheric pressure are alternately measured.

7. Device, comprising:

a lamp unit (1) having a lamp (10), in particular a High Power lamp;

a cooling unit (2) for cooling the lamp (10) during operation; and a control unit (3) for controlling both the power supply to the lamp unit (1) and the power supply to the cooling unit (2), wherein the cooling unit (2) comprises pumping means (20) for generating a flow of cooling medium and directing means (24, 25) for directing the flow of the cooling medium towards the lamp (10), wherein the control unit (3) comprises flow determining means for determining the actual rate of flow of the cooling medium, wherein the flow determining means comprise:

at least one pressure sensor (32, 33) for registering at least one pressure characteristic of the flow of the cooling medium;

an orifice (31) positioned in the flow of the cooling medium;

a relative pressure sensor (33), wherein one side of the relative pressure sensor (33) is connected to a first relative pressure measuring location (28) upstream of the orifice (31), seen in the direction in which the cooling medium flows; and controllable switching means for alternately connecting another side of the relative pressure sensor (33) to a second relative pressure measuring location (29) downstream of the orifice (31), seen in the direction in which the cooling medium flows, for the purpose of registering a pressure drop of the flow of the cooling medium across the orifice (31), and to a location outside the flow of the cooling medium, for the purpose of registering an excess pressure of the flow of the cooling medium with respect to an environmental atmospheric pressure.

8. Device according to claim 7, wherein the flow determining means comprise an absolute pressure sensor (32) for registering the pressure of the flow of the cooling medium, which pressure is a total of the environmental atmospheric pressure and the excess pressure of the flow of the cooling medium with respect to the environmental atmospheric pressure.

9. Device according to claim 7, wherein the control unit (3) comprises a driver (30) that is connected to both the lamp (10) and the at least one pressure sensor (32, 33), which driver (30) is designed for determining the power supply to the cooling unit (2) on the basis of the power supply to the lamp (10) and at least one pressure characteristic of the flow of the cooling medium registered by the at least one pressure sensor (32, 33).

10. Device according to claim 9, wherein the driver (30) is designed for checking whether the value of the pressure characteristic of the flow of the cooling medium registered by the pressure sensor (32) is within a predetermined range of values, and for stopping the power supply to the lamp (10) if it is detected that the value of the pressure characteristic of the flow of the cooling medium registered by the pressure sensor (32) is outside said predetermined range of values.

11. Device according to claim 9, wherein the driver (30) is designed for checking whether the value of the excess pressure of the flow of the cooling medium registered by the pressure sensor (33) is within a predetermined range of values, and for stopping the power supply to the lamp if it is detected that the value of the excess pressure of the flow of the cooling medium registered by the pressure sensor (33) is outside said predetermined range of values.

12. Projector, comprising a device according to claim 7.

13. Moving head fixture, comprising a device according to claim 7.

14. Driver (30) for controlling both a power supply to a lamp unit (1) having a lamp (10) and a power supply to a cooling unit (2) for cooling the lamp (10) during operation, wherein the cooling unit performs a cooling process that takes place by means of a cooling medium flowing by the lamp (10), and wherein the driver (30) controls an actual rate of flow of the cooling medium so as to equal a required value that is associated with the operating power of the lamp (10), further comprising:

means for measuring a value of pressure of the cooling medium, wherein the pressure includes a total of an environmental atmospheric pressure and an excess pressure of the flow of the cooling medium with respect to the environmental atmospheric pressure;

means for measuring a value of pressure drop of the cooling medium across an orifice positioned in the flow of the cooling medium;

means for determining a value of density of the cooling medium on the basis of the measured value of the pressure of the cooling medium; and means for determining the rate of flow of the cooling medium on the basis of the determined value of the density of the cooling medium and the measured value of the pressure drop of the flow of the cooling medium across the orifice, wherein a relation between a required value of the operating power of the cooling unit (2) and the operating power of the lamp (10) is laid down in said driver (30).

15. Driver (30) according to claim 14, designed so as to determine the value of the operating power of the cooling unit (2) also on the basis of the actual rate of flow of the cooling medium.

16. Driver (30) according to claim 15, designed so as to calculate the actual rate of flow of the cooling medium on the basis of the value of at least one pressure characteristic of the flow of the cooling medium.

17. Driver (30) according to claim 16, designed so as to check whether the value of the pressure characteristic of the flow of the cooling medium is within a predetermined range of values, and to stop the power supply to the lamp (10) if it is detected that the value of the pressure characteristic of the flow of the cooling medium is outside said predetermined range of values.

18. Method of determining the value of a flow of a cooling medium through a duct, comprising the step of measuring the value of a pressure of the cooling medium, which pressure is a total of an environmental atmospheric pressure and an excess pressure of the flow of the cooling medium with respect to the environmental atmospheric pressure, further comprising the following steps:

measuring the value of a pressure drop of the cooling medium across an orifice (31) positioned in the flow of the cooling medium;

determining the value of the density of the cooling medium on the basis of the measured value of the pressure of the cooling medium; and determining the rate of flow of the cooling medium on the basis of the determined value of the density of the cooling medium and the measured value of the pressure drop of the flow of the cooling medium across the orifice (31).

* * * * *